United States Patent
Ovshinsky et al.

(10) Patent No.: US 6,492,057 B1
(45) Date of Patent: Dec. 10, 2002

(54) ELECTROCHEMICAL CELL HAVING REDUCED CELL PRESSURE

(75) Inventors: Stanford R. Ovshinsky, Troy, MI (US); Srinivasan Venkatesan, Troy, MI (US); Boyko Alajov, Troy, MI (US); Kevin Fok, Troy, MI (US); Thomas J. Hopper, Troy, MI (US); James L. Strebe, Troy, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/291,927

(22) Filed: Apr. 14, 1999

(51) Int. Cl.[7] .................... H01M 4/36; H01M 6/04; H01M 10/26
(52) U.S. Cl. .................... 429/108; 429/201; 429/206; 429/207; 429/347
(58) Field of Search ................. 429/105, 108, 429/201, 206, 207, 347

(56) References Cited

U.S. PATENT DOCUMENTS

| | | | | | |
|---|---|---|---|---|---|
| 4,925,748 | A | * | 5/1990 | Ikoma et al. ................. | 429/59 |
| 5,302,464 | A | * | 4/1994 | Nomura et al. .............. | 428/551 |
| 5,654,114 | A | * | 8/1997 | Kubota et al. ............... | 429/218 |
| 5,798,189 | A | * | 8/1998 | Hayashida et al. .......... | 429/101 |
| 5,928,483 | A | * | 7/1999 | Szpak et al. ............. | 204/290 R |
| 5,965,294 | A | * | 10/1999 | Hamada et al. ........... | 429/218.2 |
| 5,972,531 | A | * | 10/1999 | Kawakami ................... | 429/49 |
| 6,068,948 | A | * | 5/2000 | Imoto et al. ............. | 429/218.2 |

FOREIGN PATENT DOCUMENTS

| | | |
|---|---|---|
| DE | 40 29 503 A | 3/1992 |
| JP | 05-013096 A | 1/1993 |
| JP | 05-047371 A | 2/1993 |
| JP | 05-144432 A | 6/1993 |
| JP | 06-013077 A | 1/1994 |
| JP | 08-078015 A | 3/1996 |
| JP | 08-315852 A | 11/1996 |

* cited by examiner

Primary Examiner—Wayne A. Langel
Assistant Examiner—Jonas N. Strickland
(74) Attorney, Agent, or Firm—Philip H. Schlazer; Marvin S. Siskind

(57) ABSTRACT

An alkaline electrochemical cell having a hydrogen absorbing alloy negative electrode. The electrochemical cell comprises an alkaline electrolyte comprising an additive material which reduces cell pressure by decreasing hydrogen gas evolution.

13 Claims, No Drawings

ELECTROCHEMICAL CELL HAVING REDUCED CELL PRESSURE

FIELD OF THE INVENTION

This invention relates to rechargeable electrochemical cells. In particular this invention relates to a metal hydride rechargeable electrochemical cell.

BACKGROUND OF THE INVENTION

Rechargeable electrochemical cells using a hydrogen absorbing alloy as the active material for the negative electrode are known in the art. The negative electrode is capable of the reversible electrochemical storage of hydrogen. The positive electrode typically comprises a nickel hydroxide active material. The negative and positive electrodes are spaced apart in an alkaline electrolyte, and a suitable separator (i.e., a membrane) may be positioned between the electrodes.

As shown by reaction (1), upon application of an electrical current to the negative electrode, the hydrogen absorbing alloy (M) is charged by the absorption of hydrogen to form a hydride (M—H).

$$M+H_2O+e^- \rightarrow M\text{—}H+OH^- \text{ (Charging)} \quad (1)$$

During discharge, the stored hydrogen is released by the hydride to provide an electric current and participates in electrochemical reaction, as shown by reaction (2).

$$M\text{—}H+OH^- \rightarrow M+H_2O+e^- \text{ (Discharging)} \quad (2)$$

Examples of hydrogen absorbing alloys are disclosed in U.S. Pat. Nos. 4,551,400, 4,728,586, 5,096,667, 5,135,589, 5,277,999, 5,238,756, 5,407,761, and 5,536,591, the contents of which are incorporated herein by reference.

The reactions at a conventional nickel hydroxide positive electrode as utilized in a nickel-metal hydride electrochemical cell are as follows:

$$Ni(OH)_2+OH^- \rightarrow NiOOH+H_2O+e^- \text{ (Charging)} \quad (3)$$

$$NiOOH+H_2O+e^- \rightarrow Ni(OH)_2+OH^- \text{ (Discharging)} \quad (4)$$

Hence, as shown by reactions (1) and (2) above, the charging and discharging of the electrochemical cell involves the hydriding and dehydriding of the hydrogen storage alloys. Generally, the hydriding and dehydriding reactions in the electrochemical cell are accompanied by electrochemical charge transfer. These reactions also involve the transport of hydrogen atoms into and out of the hydrogen absorbing alloy. During the operation of the cells, particularly during high rate charge and discharge, significant hydrogen pressures can develop (especially if the hydrogen transport lags behind in one direction or the other).

Specifically, during cell charging, atomic hydrogen is formed at the surface of the negative electrode. Preferably, the atomic hydrogen reacts with the hydrogen absorbing alloy as shown by reaction (1) to form a hydride. However, depending on charge conditions and surface properties of the hydrogen absorbing alloy, some of the atomic hydrogen may instead recombine with another atomic hydrogen to form molecular hydrogen gas.

While cells typically operate at pressures greater than atmospheric pressure, excessive hydrogen pressure is undesirable since it can result in a loss of aqueous-based electrolyte material, thereby limiting cell life. Also, if excess hydrogen pressure is not vented, the cell can burst, deform, or otherwise be destroyed.

Clearly, it is desirable to limit excessive hydrogen overpressure in electrochemical cells. Reduction of the internal cell pressure increases the cycle life of the electrochemical cell. The present invention relates to additive materials which may be added to cell components for reducing cell pressure by decreasing hydrogen gas evolution within the electrochemical cell.

SUMMARY OF THE INVENTION

An objective of the present invention is an electrochemical cell having decreased cell pressure. Another objective of the present invention is an electrochemical cell with improved cycle life.

These and other objectives of the invention are satisfied by an alkaline electrochemical cell, comprising: a positive electrode; a negative electrode comprising a hydrogen absorbing alloy active electrode material; and an alkaline electrolyte comprising an additive material reducing cell pressure by decreasing hydrogen gas evolution.

These and other objectives of the invention are also satisfied by an electrolyte for an alkaline electrochemical cell having a negative electrode including a hydrogen absorbing alloy, the electrolyte comprising: an alkaline ion-conducting medium; and an additive material reducing cell pressure by decreasing hydrogen gas evolution.

These and other objectives of the invention are also satisfied by an alkaline electrochemical cell, comprising: at least one positive electrode; at least one negative electrode; and an alkaline electrolyte, the negative electrode comprising: a conductive substrate; and an active composition affixed to the substrate, the active composition comprising: a hydrogen absorbing alloy, and an additive material reducing cell pressure by decreasing hydrogen gas evolution.

These and other objectives of the invention are also satisfied by an electrode of an alkaline electrochemical cell, comprising: a conductive substrate; and a active composition comprising: a hydrogen absorbing alloy active electrode material, and a additive material reducing cell pressure by decreasing hydrogen gas evolution.

DETAILED DESCRIPTION OF THE INVENTION

Disclosed herein is an alkaline, metal hydride electrochemical cell. The electrochemical cell comprises one or more positive electrodes, one or more negative electrode, and an alkaline electrolyte. Separators are typically positioned between the positive and negative electrodes to electrically isolate the positive electrodes from negative electrodes.

Each of the positive electrodes comprises a positive electrode active material that is affixed to a conductive substrate. Preferably, the positive electrode active material comprises a nickel hydroxide active electrode material. Each of the negative electrodes comprises a negative electrode active material that is affixed to a conductive substrate. In the present invention, the negative electrode active material is a hydrogen absorbing alloy. It is within the spirit and scope of the present invention that any hydrogen absorbing alloy can be used.

Generally, the conductive substrates used for the positive and negative electrodes may be any electrically conductive support structure. Examples of conductive substrates include expanded metal, mesh, foam, grid, and plate. The substrate may be made from any electrically conductive material. The materials are preferably chosen so as to be immune from corrosion at the pH and potential at which the electrodes operate. The conductive substrate for the positive electrode is preferably a nickel foam or a nickel alloy foam. The conductive substrate for the negative electrode preferably has the form of an expanded metal. The substrate may comprise nickel, a nickel alloy, copper, a copper alloy, nickel-plated copper, or copper-plated nickel.

The alkaline electrolyte is an ion-conducting medium. The electrolyte is preferably an aqueous solution of an alkali metal hydroxide. Examples of alkali metal hydroxides include potassium hydroxide, sodium hydroxide, lithium hydroxide, and mixtures thereof. Preferably, the alkali metal hydroxide comprises potassium hydroxide. More preferably, the alkali metal hydroxide comprises about a 30 weight percent aqueous solution of potassium hydroxide.

In one embodiment of the present invention, the electrolyte further comprises an additive material which decreases the pressure within the electrochemical cell by reducing the evolution of hydrogen gas. Preferably, the additive material is selected from the group consisting of thiourea, urea, thiophene, thioalcohol, thiocyanate, pyrrole, cysteine, cynanide, sulfide, bisulfide, and mixtures thereof. More preferably, the additive comprises thiourea.

Specifically, the additive material may be added to the electrolyte by being mixed into the aqueous solution with the alkali metal hydroxide. Preferably, about 0.01 weight percent to about 5 weight percent of the additive material is added to the electrolyte. More preferably, about 0.05 weight percent to about 1 weight percent of the additive material is added to the electrolyte.

The additive material may be added to other components of the electrochemical cell. In another embodiment of the present invention, the additive material may be mixed with the hydrogen absorbing alloy to form an active composition. The active composition may then be affixed to a conductive substrate to form a negative electrode for an substrate. This may be done by first making the hydrogen absorbing material into a paste (with the addition of water and a thickener) and physically mixing small amounts of the additive material (for example, the thiourea) into the paste. The paste is then applied to the conductive substrate to form a negative electrode. Preferably, the active composition comprises between about 0.01 to about 5 weight percent of the additive material. More preferably, the active composition comprises between about 0.05 to about 1 weight percent of the additive material.

The additive material may also be added to the positive electrode active material. This may be done by first making the positive electrode material into a paste via the addition of water and a thickener. The additive material is then physically mixed into the paste and the paste and is applied to the conductive substrate to form the positive electrode. Preferably, the positive electrode active composition comprises between about 0.01 to about 5 weight percent of the additive material. More preferably, the positive electrode active composition comprises between about 0.05 to about 1 weight percent of the additive material.

The additive material may be added to one or more of the separators. For example, the thiourea may be added to a separator by first forming an aqueous solution of the thiourea and then soaking the separator in this solution.

Hydrogen evolution proceeds at the surface of the hydrogen absorbing alloy. While not wishing to be bound by theory, it is believed that the mechanism for hydrogen evolution in a metal hydride electrochemical cell may be explained as follows. During charging of the electrochemical cell, water dissociates into hydrogen atoms and hydroxyl ions. The hydrogen atoms from the water molecules adsorb onto the surface of the hydrogen absorbing alloy. This is shown by equation 5(a) below.

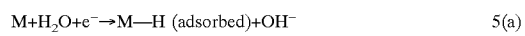

$$M+H_2O+e^- \rightarrow M\text{---}H \text{ (adsorbed)}+OH^- \qquad 5(a)$$

The adsorbed hydrogen may then be absorbed into the hydrogen absorbing alloy so as to form a metal hydride as shown by reaction 5(b). Alternately, the adsorbed hydrogen atoms may combine with other adsorbed hydrogen atoms to form hydrogen molecules as shown by reaction 5(c).

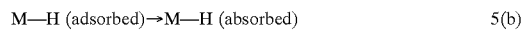

$$M\text{---}H \text{ (adsorbed)} \rightarrow M\text{---}H \text{ (absorbed)} \qquad 5(b)$$

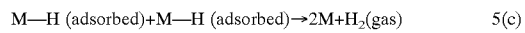

$$M\text{---}H \text{ (adsorbed)}+M\text{---}H \text{ (adsorbed)} \rightarrow 2M+H_2(gas) \qquad 5(c)$$

When hydrogen gas is formed via reaction 5(c), hydrogen gas evolution occurs and the hydrogen pressure within the electrochemical cell increases. It is noted that if the surface of the hydrogen absorbing alloy is covered with an oxide or other impurity, hydrogen evolution is preferred rather than hydride formation.

Again, while not wishing to be bound by theory, it is further believed that the additive material of the present invention (or the ionized components of the additive) adsorbs onto the surface of the hydrogen absorbing alloy and inhibits atomic hydrogen recombination (i.e., inhibits the atomic hydrogen from coming together to form the molecular hydrogen). This decreases the evolution of hydrogen gas within the electrochemical cell and also increases the amount of atomic hydrogen available for hydride formation. It is noted that any species that competes with hydrogen adsorption onto the surface of the alloy material will have a negative influence on the kinetics of the hydrogen evolution reaction.

Also disclosed herein is an electrolyte for an electrochemical cell. The electrolyte comprises an ion-conducting medium, and an additive comprising a compound selected from the group consisting of Preferably, the additive comprises thiourea.

The ion-conducting medium is preferably, an aqueous solution of an alkali metal hydroxide. The alkali metal hydroxide may be selected from the group consisting of potassium hydroxide, sodium hydroxide, lithium hydroxide, and mixtures thereof.

EXAMPLE

A first nickel-metal hydride cell (the control cell) is made using metal hydride negative electrodes and nickel hydroxide positive electrodes. An alkaline electrolyte containing about a 30 weight percent potassium hydroxide solution is added to the cell.

A second nickel-metal hydride cell (the test cell) is made. The second cell is identical to the first cell except that about 0.1 weight percent of thiourea is added to the electrolyte.

The first and second cells are repeatedly charged and discharged. At the end of charge (after 57 charge/discharge cycles), the internal gas pressure and the gas composition (normalized to $H_2$ and $O_2$ only) of each of the cells is determined. The results are shown in the Table below.

TABLE

|  | gas pressure | gas composition |
| --- | --- | --- |
| Cell w/o thiourea (control) | 94 psi | 94.7% H$_2$/5.3% O$_2$ |
| Cell with thiourea (test) | 54 psi | 70.0% H$_2$/30.0% O$_2$ |

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims appended hereinafter.

We claim:

1. An alkaline electrochemical cell, comprising:

a positive electrode;

a negative electrode comprising a hydrogen storage alloy; and an alkaline electrolyte comprising an aqueous solution of an alkali metal hydroxide and an additive material selected from the group consisting of thiourea, urea, thiophene, thiocyanate, thioalcohol, pyrrole, cysteine, cyanide, sulfide, and mixtures thereof bisulfide.

2. The electrochemical cell of claim 1 wherein said additive material inhibits hydrogen recombination.

3. The electrochemical cell of claim 1, wherein said electrolyte comprises between about 0.01 weight percent and about 5 weight percent of said additive material.

4. The electrochemical cell of claim 1, wherein said additive material is thiourea.

5. The electrochemical cell of claim 1 wherein said alkali metal hydroxide includes potassium hydroxide, sodium hydroxide or lithium hydroxide.

6. The electrochemical cell of claim 1, wherein said positive electrode comprises a nickel hydroxide material.

7. An alkaline electrochemical cell, comprising:

a positive electrode;

a negative electrode comprising a hydrogen storage alloy and an additive material selected from the group consisting of thiourea, urea, thiophene, thiocyanate, thioalcohol, pyrrole, cysteine, cyanide, sulfide, and mixtures thereof bisulfide; and an alkaline electrolyte comprising an aqueous solution of an alkaline metal hydroxide.

8. The electrochemical cell of claim 7, wherein said additive material inhibits hydrogen recombination.

9. The electrochemical cell of claim 7, wherein said active composition comprises between about 0.01 weight percent and about 5 weight percent of said additive material.

10. The electrochemical cell of claim 7, wherein said active composition is pasted onto a conductive substrate.

11. The electrochemical cell of claim 7, wherein said additive material is thiourea.

12. The electrochemical cell of claim 7, wherein said alkali metal hydroxide includes potassium hydroxide, sodium hydroxide or lithium hydroxide.

13. The electrochemical cell of claim 7, wherein said electrochemical cell further includes a nickel hydroxide electrode.

* * * * *

UNITED STATES PATENT AND TRADEMARK OFFICE
CERTIFICATE OF CORRECTION

PATENT NO.    : 6,492,057 B1
DATED         : December 10, 2002
INVENTOR(S)   : Stanford R. Ovshinsky et al.

It is certified that error appears in the above-identified patent and that said Letters Patent is hereby corrected as shown below:

<u>Column 5,</u>
Line 26, "and mixtures thereof bisulfide" should read -- bisulfide, and mixtures thereof --

<u>Column 6,</u>
Lines 12-13, "and mixtures thereof bisulfide" should read -- bisulfide, and mixtures thereof --

Signed and Sealed this

Twenty-fourth Day of June, 2003

JAMES E. ROGAN
*Director of the United States Patent and Trademark Office*